Patented Dec. 8, 1942

2,304,750

UNITED STATES PATENT OFFICE 2,304,750

CERAMIC PIGMENT

Charles G. Geary, Perth Amboy, N. J., assignor to E. I. du Pont de Nemours & Company, Wilmington, Del., a corporation of Delaware No Drawing. Application July 12, 1940, Serial No. 345,103

1 Claim. (Cl. 106—293)

This invention is concerned with the preparation of improved ceramic pigments for graining. More particularly, it is concerned with the preparation of chromium-containing black ceramic pigments which are especially satisfactory for use in printing or surface ornamentation on vitreous enamels.

The usual practice of decorative printing on vitreous enamels is known as graining or marbleizing. It consists essentially in applying a pigment suspended in a suitable medium to an etched marble slab or metal plate, or to a flat piece of wood, removing the excess pigment by scraping so that only the indented portion of the etching contains pigment, and then transferring this pigment to the surface of the enameled ware by means of a rubber or soft composition roller. In this way a design is imprinted on the enamel, which enamel may be fired or unfired prior to the printing operation, but which is usually in the unfired condition. The ware containing the vitreous enamel is then subjected to firing and the design, which may take any desired form, is fused or burned into the surface of the enamel.

Not all ceramic pigments are satisfactory for the purpose of printing or decorating upon the surfaces of vitreous enamels by means of the process known as graining or marbleizing. It is particularly true that many black pigments, especially those which are high in chromium content, are unsuitable for this purpose since they show a tendency to sink into the surface of the enamels to which they are applied, thus leaving an uneven surface with the lines of the design indistinct and sunken. This sinking-in, characteristic of black ceramic pigments containing chromium, is almost always accompanied by the formation of a soluble form of chromium which may be detected on the surface of the ceramic article after the firing operation. As a result, chromium-containing black ceramic pigments have not been generally used for graining purposes, and it has been necessary to utilize other types of black pigments, such as those of high cobalt content, where decorative printing on the surface of vitreous enamels is carried out.

I have now found that chromium-containing black ceramic pigments intended for use as graining pigments exhibit a lessened tendency to the formation of soluble forms of chromium when there is present in such pigments a small amount of zinc sulphide. In particular, I have found that an amount of zinc sulphide, generally not over 8 to 10% based on the total weight of the black chromium-containing pigment, when present in compositions of this type including even those of high chromium content, will result in pigments which, when utilized for graining purposes, manifest substantially no tendency whatever toward undesirable sinking of the pigment into the surface of the enamel.

Accordingly, it is one of the objects of this invention to prepare black ceramic pigments containing chromium which will be entirely suitable when utilized for graining or marbleizing in decorative printing on vitreous enamels, and which will result in smooth graining comparable with the best results obtainable with any of the graining pigments now employed in commercial operations for this purpose. It is a further object of this invention to improve black ceramic pigments of the chromium-containing type so as to render them suitable for graining or marbleizing on the surface of vitreous enamels without any danger of undesirable sinking of the pigment into the surface of the enamel, or tendency to produce a design having an uneven surface with the lines indistinct and sunken. These and still other objects of my invention will be apparent from the ensuing disclosure of certain improved embodiments thereof.

My invention is applicable to chrominum-containing black ceramic pigments of the type now known in the art. As illustrative of these, reference is made to "The Collected Writings of Herman August Seger," published by the Chemical Publishing Company, 1902, vol. 2, page 659, as well as to various other technical publications dealing with this well-known type of ceramic pigment. It is intended to include within the meaning of this term as employed herein all black ceramic pigments falling within this well-known classification.

In producing improved chromium-containing black ceramic pigments suitable for graining, I add a small amount of zinc sulphide, generally not over 8 to 10% based on the total weight of the pigment, to the chromium-containing ceramic pigment. The resulting pigment when used for graining gives decorative designs which are perfectly smooth and of good quality. There is substantially no tendency whatever for the pigment to sink into the enamel on which it is imprinted, a defect generally characteristic of the chromium ceramic pigments not containing zinc sulphide.

As an example of an improved black ceramic pigment especially suitable for use in graining or marbleizing on vitreous enamel surfaces, the following may be given.

Example 1

A black ceramic pigment was prepared by calcining a mixture of equal parts of iron oxide, chromic oxide, and cobalt oxide. This resulted in a chromium-containing pigment of the iron-chrome-cobalt type.

To 10 grams of the chromium-containing black ceramic pigment, there was added one gram of zinc sulphide. The ingredients were well mixed by mulling on a glass slab. The resulting pigment, when mixed with a suitable medium and grained over a fired coat of enamel, exhibited no sinking or blurring of the design such as ordinarily results when an iron-chrome-cobalt black ceramic pigment containing no zinc sulphide is utilized for graining purposes. There was no trace whatever of soluble chromium on the surface of the ceramic article after the firing operation.

Example 2

A mixture of 324 parts of iron oxide, 405 parts chrome oxide, 405 parts manganese oxide, 122 parts of nickel oxide, and 398 parts of cobalt oxide was calcined to give a chromium-containing black pigment.

To 10 grams of this pigment was added 1 gram of zinc sulphide, and the whole was mixed and grained as in Example 1. After firing, the resulting graining was very satisfactory as to distinctness of design, and absence of soluble chrome.

Example 3

A mixture of 126 parts of manganese oxide, 126 parts of cobalt oxide, 240 parts of potassium dichromate, 240 parts of iron oxide, 63 parts of flint, and 32 parts of kaolin was calcined to give a black pigment.

10 grams of this chromium-containing black pigment was mixed with 1 gram of zinc sulphide. After mulling with a suitable medium, the sulphided pigment was grained and fired in the usual manner, and gave a fired result that was markedly superior to that obtained with the untreated black.

The addition of zinc sulphide to chromium-containing pigments to prepare graining pigments as above described results in strong black coloring agents suitable for graining of a type which would not otherwise be available for such purposes except under the most favorable conditions. The cost of the improved zinc sulphide-containing pigments, suitable for use as graining pigments, is generally much less than that of the black oxides now commercially utilized for such purposes. The pigments generally employed in the past have been rendered more expensive by the necessity of providing a high content of cobalt oxide, since the chromium content was ordinarily much reduced and, in some instances, even entirely eliminated.

It should be understood that various changes may be made in the process and improved pigments as described which will nevertheless come within the scope of my invention. Various details given herein as merely illustrative of preferred embodiments should not be construed as restrictive, except as necessitated by the prior art or appended claim.

I claim:

An improved black ceramic pigment suitable for use as a graining pigment which comprises an iron-chrome-cobalt black ceramic pigment and zinc sulphide, said zinc sulphide being present in amounts not exceeding 10% by weight based on the total weight of said graining pigment.

CHARLES G. GEARY.